United States Patent [19]

Hulse et al.

[11] 3,887,384

[45] June 3, 1975

[54] TOUGH REFRACTORY OXIDE EUTECTIC ARTICLE

[75] Inventors: Charles O. Hulse, South Glastonbury; John A. Batt, Ellington, both of Conn.

[73] Assignee: United Aircraft Corporation, East Hartford, Conn.

[22] Filed: Feb. 27, 1974

[21] Appl. No.: 446,578

[52] U.S. Cl. .................... 106/57; 106/39.5; 106/63
[51] Int. Cl. ............................................ C04b 35/48
[58] Field of Search........................ 106/39.5, 57, 63

[56] References Cited
UNITED STATES PATENTS

| | | | |
|---|---|---|---|
| 3,523,915 | 8/1970 | Anthony et al. | 106/57 |
| 3,761,295 | 9/1973 | Hulse et al. | 106/39.5 |

*Primary Examiner*—J. Poer
*Attorney, Agent, or Firm*—Richard N. James

[57] ABSTRACT

An article exhibiting high toughness to very high temperatures is provided by a directionally-solidified eutectic alloy having a lamellar $ZrO_2$ phase embedded in a matrix of $CaO/ZrO_2$.

2 Claims, 3 Drawing Figures

TOUGH REFRACTORY OXIDE EUTECTIC ARTICLE

The invention herein described was made in the course of or under a contract with the Department of the Navy.

BACKGROUND OF THE INVENTION

The present invention relates in general to eutectic refractory oxide compositions, particularly as directionally solidified and in anisotropic form.

The temperature requirements for materials used in high-temperature, high-stress applications, such as in gas turbine engines, have continually increased until they are now so close to the melting temperature of the nickel and cobalt superalloys that further temperature increases of any substantial nature cannot be tolerated in these superalloy systems. A logical response to this circumstance is an investigation of the possibilities of completely different types of materials.

Pure oxide ceramics have a number of properties which make them of possible interest: high melting points, good resistance to corrosion by liquids and gases, and high potential strength-to-weight ratios. However, typical of the limitations which currently restrict their use in many environments are low tensile strength and an inability to plastically relieve internal stress concentrations. As a result, ceramics are as a general rule brittle and heat-shock sensitive, and do not exhibit reproducible design strength values.

Although there have been relatively few studies of the toughness of ceramics, the toughness requirements will depend upon extremely high density, smallest possible microstructure, highest possible purity, high bond strength, and minimum possible internal stress due to differences in thermal expansion.

A common approach to the fabrication of ceramics is a hot-pressing approach. Extremely fine reactive charge powders are employed in order to hot-press at low enough temperatures to achieve both theoretical density and a fine grain size. Unfortunately, these fine reactive powders tend to pick up gases which cannot generally be removed without destroying the reactivity so essential to successful hot-pressing. When many hot-pressed ceramic materials are subsequently heated to high temperatures, the gases contained therein tend to form voids and pieces may actually explode.

Another difficulty associated with the hot-pressed materials, and perhaps a more serious problem, is that fine grain size material necessarily contains many grain boundaries. These boundaries are not thermodynamically stable and at high temperatures grain boundary area tends to be reduced by grain growth. Thus, in long term use, the advantage of the original fine grain size is significantly reduced. Even if grain growth should be avoided, the presence of grain boundaries per se is detrimental to strength at high temperatures.

There are a number of possibilities for producing improvements in the mechanical properties of ceramic materials. One possibility is a directional eutectic microstructure which is distinct from that microstructure available from hot-pressing techniques. One immediate possibility is an anisotropic microstructure wherein one phase of high strength characteristics is embedded in a somewhat more ductile ceramic matrix. This type of microstructure has been demonstrated in numerous metallic eutectic systems, as will be noted from the following patents of the same assignee: U.S. Pat. Nos. 3,793,010; 3,671,223; and 3,564,940, for example. An anisotropic, directionally solidified, refractory oxide eutectic microstructure has also been disclosed by the present inventors in U.S. Pat. No. 3,761,295.

An important advantage of the directionally-solidified eutectics for high temperature strength applications is that their microstructure is extremely stable, practically to their melting point. This stability results in the fact that their microstructures are produced directly from the molten state under conditions of thermodynamic equilibrium. Furthermore, if grain boundaries are present in these microstructures, they are relatively few in number and generally parallel to the axis of primary reinforcement.

SUMMARY OF THE INVENTION

The present invention relates to directionally-solidified refractory oxide articles. In particular the present invention provides an article of particular composition which exhibits high toughness to very high temperatures. The desired high toughness is provided in a directionally-solidified eutectic alloy having a lamellar $ZrO_2$ phase embedded in a matrix of $CaO/ZrO_2$ ($CaZrO_3$, Calcium Zirconate).

DESCRIPTION OF THE PREFERRED EMBODIMENTS

The eutectic involved in the present invention is that existing between $CaO/ZrO_2$ and $ZrO_2$. This eutectic composition melts at 2300°C. and both phases are cubic. The coefficients of thermal expansion of the two phases are identical and, therefore, any possible effects due to this variable are eliminated. The eutectic also exhibits a unique ability to undergo plastic deformation at elevated temperatures without loss of strength.

The microstructure of the directionally-solidified eutectic is lamellar with the maximum spacing between the lamellae being approximately three microns when solidified at a rate of ten centimeters per hour.

Figure 1:
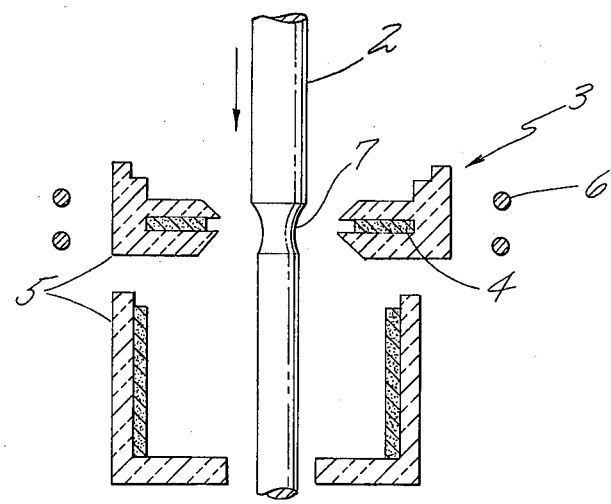
FIG. 1 is a schematic of the floating molten zone apparatus utilized in preparing the directionally-solidified ingots according to the present invention.

Directionally-solidified ingots of the $CaO/ZrO_2$ – $ZrO_2$ eutectic were prepared by utilizing a floating molten zone technique in apparatus as shown schematically in FIG. 1. The sintered charge rod 2 was traversed at about ten centimeters per hour through a small furnace 3 which consisted of a carbon ring susceptor 4 surrounded by $ZrO_2$ fiber insulation 5 and a two-turn RF coil 6 operating at 550 kilocycles. After one preliminary pass in argon at about 1900°C. to sinter and degas the charge rod, two molten zone 7 passes were made in an argon atmosphere.

The charge rods were prepared from fine powders of $ZrO_2$ and CaO with high purities. All weights of CaO powders were taken in dry argon to avoid complications due to hydration. The batch powders were hand-mixed in air and hydrostatically pressed into bars at 10,000 psi without the use of a binder. The final preparation step was hand-sanding into straight charge rods five inches long and one-half inch in diameter.

Samples were prepared from the directionally-solidified ingots which had previously been annealed for two hours at 1600°C. in air. These samples were typically 0.25 inch by 0.25 inch by 2 inches with the direction of solidification parallel to the longest dimension.

The fracture samples were broken with relatively stable fracture propagation using a four screw 60,000 lb. Tinius Olson universal testing machine with the cross head moving at 0.0025 inches per minute. Elevated temperature testing was done in air using alumina fixtures and solid alumina floating rams two inches in diameter.

It turned out to be very difficult to prepare eutectic ingots sufficient to prepare the desired fracture bars with a uniform eutectic microstructure throughout. One reason for this was that there was always some loss of CaO during the zone melting which made it difficult to hold the ingots to the exact eutectic composition. In one batch of material the volume fraction of $ZrO_2$ as determined by optical photographs was 32 volume percent, compared to the 41 volume percent indicated in the equilibrium phase diagram. The batch composition finally selected consisted of about 24 weight percent CaO with the remainder $ZrO_2$. However, the off-eutectic samples evidenced the property improvement potential.

In the solidified ingots near the surface thereof and inward typically for about one-eighth of an inch relatively perfect lamellar eutectic microstructures were always obtained. These microstructures consisted of lamellae parallel to the direction of solidification. Near the center of the ingots, the liquid-solid thermal gradients were not sufficiently high to produce comparable microstructures. In the central regions there were eutectic colonies and dendrites.

Stable crack growth could be obtained in work-to-fracture experiments at room temperatures, but the mechanism of fracture was difficult to interpret. There was no evidence of delamination between the two phases, however. The effect of the eutectic microstructure on fracture was orientation-dependent.

Figure 2:
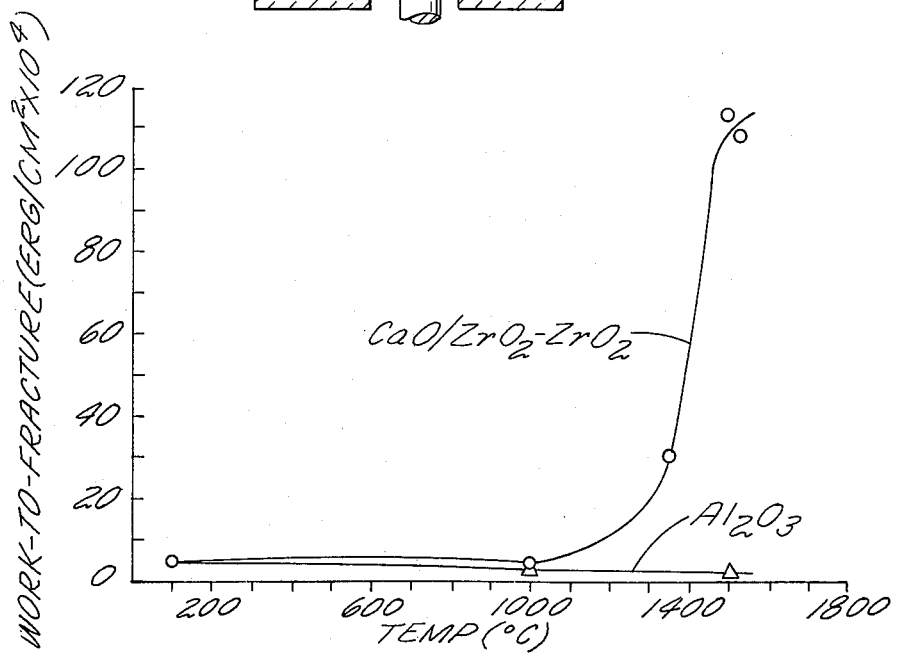
FIG. 2 is a graph comparing the work-to-fracture properties of the present invention to polycrystalline $Al_2O_3$.

The fracture surfaces and work-to-fracture energy at 1000°C. were similar to those obtained at room temperature, but with tests at higher temperatures much larger work-to-fracture energies were obtained as demonstrated in FIG. 2.

Figure 3:
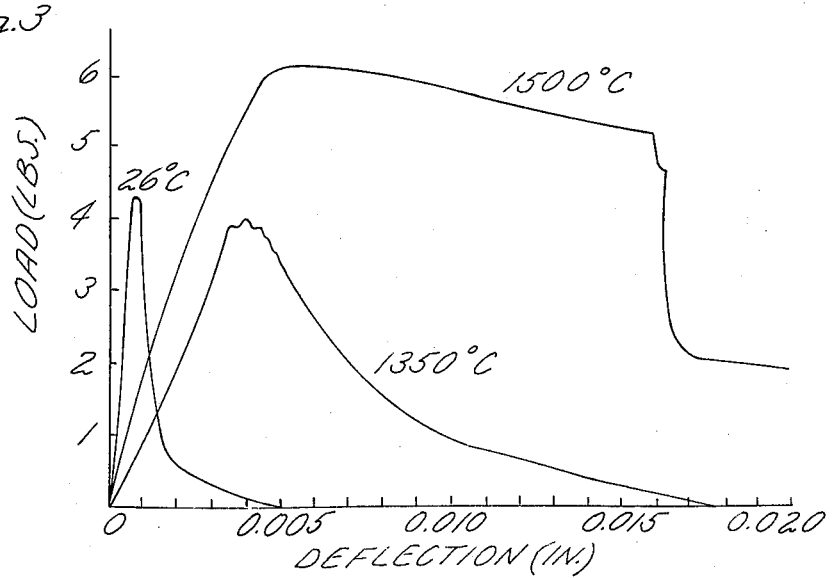
FIG. 3 is a graph depicting the work-to-fracture force/deflection curves for the directionally-solidified eutectic of the present invention at several temperatures.

FIG. 3 shows force/deflection curves at different temperatures which indicate not only that there is a large increase in deformation at temperatures higher temperature but also that the forces required for fracture can be considerably greater than those required at lower temperatures. These results demonstrate that the strength of this eutectic at 1500°C. is larger than that at room temperature.

Metallurgical examination of the fracture surfaces obtained at 1500°C. establishes that at these temperatures the eutectic behaves in a typical composite manner with the more ductile $CaO/ZrO_2$ matrix being reinforced by the stronger $ZrO_2$ lamellar phase. Energy is absorbed in deforming the more ductile matrix phase and in the shear processes involved in pulling the $ZrO_2$ phase out of this matrix. The fracture energy at 1500°C. is 28 times greater than at room temperature.

Three-point bend strength results were also obtained using an elastic beam theory, as shown in the following Table.

| Sample No. | Solidification Speed (cm/hr) | Strength (lb/in$^2$) | Temperature (°C) | Remarks |
|---|---|---|---|---|
| A | 6 | 33,600 | 850 | Brittle |
| B | 6 | 83,700 | 1500 | Slight yield |
| C | 6 | 30,100 | 1600 | * |
| D | 20 | 51,500 | 1600 | ** |

*plastic yielding with some plastic flow
**plastic yielding with extensive plastic flow; bent to limit of fixture For the purposes of comparison the strength of this material at 1600°C. should be related to that of polycrystalline alumina at about 1500 lb/in$^2$. It should be emphasized that even these results are expected to be improved as further development optimizes the fabrication technology and microstructures for the $CaO/ZrO_2 - ZrO_2$ system.

Thus, from the foregoing it will be seen that there is provided in this directionally-solidified eutectic system a tough microstructure stable to temperatures practically to its melting point of 2300°C. The article undergoes a dramatic increase in work-to-fracture energy in the temperature range of 1300°–1400°C. and the thermal coefficient of expansion of both the matrix phase and the lamellar phase are identical, therefore eliminating any possible adverse effects due to differences therebetween. The results also demonstrate that the basic microstructure is fairly flexible with respect to compositions which are off the true eutectic composition and dramatic improvements were obtained even with the off-eutectic microstructures.

The invention has been described in detail in connection with certain preferred embodiments and examples, but these will be understood to be illustrative only and no limitation is intended thereby. The invention in its broader aspects is not limited to the specific details shown and described but departures may be made from such details without departing from the principles of the invention and without sacrificing its chief advantages.

We claim:

1. A directionally solidified refractory oxide composite article comprising a matrix phase consisting essentially of a compound of calcium oxide and zirconium oxide and a reinforcing phase consisting essentially of zirconium oxide embedded therein in the form of lamellae substantially oriented in the direction of principal anticipated stress.

2. An anisotropic refractory composite article having an overall composition consisting essentially of a compound of calcium oxide and zirconium oxide close to the $CaO/ZrO_2 - ZrO_2$ eutectic composition segregated in a matrix phase consisting essentially of $CaO/ZrO_2$ and a substantially aligned $ZrO_2$ lamellar phase, the article exhibiting high toughness at high temperature.

* * * * *